US012389160B2

(12) United States Patent
Laroche et al.

(10) Patent No.: US 12,389,160 B2
(45) Date of Patent: Aug. 12, 2025

(54) MICROPHONE APPARATUS

(71) Applicant: GN Audio A/S, Ballerup (DK)

(72) Inventors: Clément Laroche, Ballerup (DK); Pejman Mowlaee, Ballerup (DK); Rasmus Kongsgaard Olsson, Ballerup (DK); Michael Sødal Schwartz, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 282 days.

(21) Appl. No.: 18/164,052

(22) Filed: Feb. 3, 2023

(65) Prior Publication Data

US 2023/0300526 A1 Sep. 21, 2023

(30) Foreign Application Priority Data

Mar. 21, 2022 (EP) .................................... 22163343

(51) Int. Cl.

| | |
|---|---|
| ***H04R 3/00*** | (2006.01) |
| ***G10L 25/60*** | (2013.01) |
| ***G10L 25/78*** | (2013.01) |
| ***H04R 1/08*** | (2006.01) |
| ***H04R 1/40*** | (2006.01) |
| ***H04R 29/00*** | (2006.01) |

(52) U.S. Cl.

CPC .............. *H04R 3/005* (2013.01); *G10L 25/60* (2013.01); *G10L 25/78* (2013.01); *H04R 1/08* (2013.01); *H04R 1/406* (2013.01); *H04R 29/005* (2013.01); *H04R 2201/401* (2013.01)

(58) Field of Classification Search

CPC ........... G10L 25/60; G10L 25/78; H04R 1/08; H04R 1/406; H04R 29/005; H04R 2201/401

USPC ............................ 381/56, 58, 362, 375, 390

See application file for complete search history.

(56) References Cited

U.S. PATENT DOCUMENTS

| | | | |
|---|---|---|---|
| 7,346,176 B1 | 3/2008 | Bernardi et al. | |
| 2010/0128892 A1 | 5/2010 | Chen et al. | |
| 2010/0177908 A1 | 7/2010 | Seltzer et al. | |
| 2013/0297305 A1* | 11/2013 | Turnbull | G10L 15/20 704/E15.039 |
| 2015/0003623 A1 | 1/2015 | Rasmussen | |
| 2018/0122400 A1* | 5/2018 | Rasmussen | H04R 3/005 |

(Continued)

FOREIGN PATENT DOCUMENTS

| | | |
|---|---|---|
| CN | 114125677 A | 3/2022 |
| EP | 3007170 A1 | 4/2016 |
| WO | 2018127447 A1 | 7/2018 |

OTHER PUBLICATIONS

The extended European search report issued in European Application No. 22163343.1, dated Sep. 28, 2022.

(Continued)

*Primary Examiner* — William A Jerez Lora

(74) *Attorney, Agent, or Firm* — HSML P. C.

(57) ABSTRACT

The present disclosure relates to a microphone apparatus and an associated computer implemented method. The microphone apparatus comprising a main microphone array, an adaptive beamformer, a fixed beamformer, and an analyzer. The analyzer is configured to determine a first relative score based on the output of the fixed beamformer and the adaptive beamformer. The first relative score indicating a difference between the adaptive beamformer and the fixed beamformer.

16 Claims, 3 Drawing Sheets

(56) References Cited

U.S. PATENT DOCUMENTS

2020/0145752 A1 5/2020 Janse et al.
2022/0232331 A1 * 7/2022 Jelcicová ............. H04R 25/405

OTHER PUBLICATIONS

Office Action issued in Chinese Application No. 202310232386..8, mailed Jun. 14, 2025, with English machine translation, 10 pages provided.

* cited by examiner

MICROPHONE APPARATUS

TECHNICAL FIELD

The present disclosure relates to a microphone apparatus and an associated computer implemented method.

BACKGROUND

In conventional microphone apparatuses it is not uncommon for them to comprise a microphone array where sound is captured with no directional sensitivity, i.e., sound is captured equally from all directions. However, for many purposes having no directional sensitivity is less than opportune. For example, during a call where a microphone is supposed to pick up the voice of the user, having no directional sensitivity leads to sounds created by the environment surrounding the user being equally picked up by the microphone. Sounds created by the environment may muddle or otherwise interfere, making the voice of the user unintelligible. This is especially a problem when the microphone is moved away from the mouth, e.g., as seen in earbuds, headsets, and speakerphones.

To overcome the problems associated with no directional sensitivity, beamforming is a commonly applied technique. Beamforming is a technique for further processing audio signals picked up by an array of microphones. Beamforming relies on the fact, that a soundwave created by a source in space surrounding the microphone array will have a different incidence time for different microphones of the microphone array, consequently, the phase of the soundwave picked up by the different microphones will differ from each other. Hence, by filtering the audio signals, and combining the audio signals a new audio signal with a directional sensitivity may be achieved. Beamforming may thus be used to focus an audio signal on the direction of a sound source. Furthermore, beamforming may help in alleviating problems arising from poor placement of the microphone apparatus by compensating for mispositioning of the microphone. However, even with the use of beamforming, correct placement of the microphone relative to the sound source is still a vital parameter for obtaining a high-quality audio signal, be it to compensate for distance versus signal to noise ratio, the microphones being calibrated for specific positions, or due to the geometry of the microphone array.

An example of compensating for mispositioning is disclosed in U.S. Pat. No. 7,346,176 B1 which discloses a system and method that detects whether a microphone apparatus is positioned incorrectly relative to an acoustic source and of automatically compensating for such mispositioning. A position estimation circuit determines whether the microphone apparatus is mispositioned. A controller facilitates automatic compensation of the mispositioning.

Another example is disclosed in EP 3007170 A1 which discloses a method for optimizing noise cancellation in a headset, the headset comprising a headphone and a microphone unit comprising at least a first microphone and a second microphone, the method comprising: generating at least a first audio signal from the at least first microphone, where the first audio signal comprises a speech portion from a user of the headset and a noise portion from the surroundings; generating at least a second audio signal from the at least second microphone, where the second audio signal comprises a speech portion from the user of the headset and a noise portion from the surroundings; generating a noise cancelled output by filtering and summing at least a part of the first audio signal and at least a part of the second audio signal, where the filtering is adaptively configured to continually minimize the power of the noise cancelled output, and where the filtering is adaptively configured to continually provide that at least the amplitude spectrum of the speech portion of the noise cancelled output corresponds to the speech portion of a reference audio signal generated from at least one of the microphones.

US 2013/297305 A1 discloses a non-spatial speech detection system which includes a plurality of microphones whose output is supplied to a fixed beamformer. An adaptive beamformer is used for receiving the output of the plurality of microphones and one or more processors are used for processing an output from the fixed beamformer and identifying speech from noise though the use of an algorithm utilizing a covariance matrix.

US 2010/177908 A1 describes an audio signal processing technology in which an adaptive beamformer processes input signals from microphones based on an estimate received from a pre-filter. The adaptive beamformer may compute its parameters (e.g., weights) for each frame based on the estimate, via a magnitude-domain objective function or log-magnitude-domain objective function. The pre-filter may include a time invariant beamformer and/or a nonlinear spatial filter, and/or may include a spectral filter. The computed parameters may be adjusted based on a constraint, which may be selectively applied only at desired times.

WO 2018/127447 A1 discloses an apparatus for capturing audio comprising a first beamformer coupled to a microphone array and arranged to generate a first beamformed audio output.

However, correct positioning of microphones and how to achieve this, or how to compensate for improper positioning remains a critical issue and there is still room for improvements.

SUMMARY

It is an object of the present disclosure to provide an improved microphone apparatus which overcomes or at least alleviates the problems of the prior art. These and other objects of the disclosure are achieved by the disclosure defined in the independent claims and explained in the following description. Further objects of the disclosure are achieved by embodiments defined in the dependent claims and in the detailed description of the disclosure.

According to a first aspect of the disclosure there is provided a microphone apparatus comprising a main microphone array, an adaptive beamformer, a fixed beamformer, and an analyzer, wherein the main microphone array comprises a first microphone adapted to provide a first input audio signal representing sound at a first microphone inlet, a second microphone adapted to provide a second input audio signal representing sound at a second microphone inlet, wherein the first microphone inlet is spatially separated from the second microphone inlet, and wherein the main microphone array is configured to:

- provide a main input vector comprising the first and the second input audio signal as components, wherein the adaptive beamformer is configured to:

- based on the main input vector, provide a first directional audio signal, wherein a directional sensitivity of the first directional audio signal is chosen to optimize a speech quality, wherein the fixed beamformer is configured to:

- based on the main input vector, provide a second directional audio signal, wherein a directional sensitivity of the second directional audio signal is predetermined, and wherein the analyzer is configured to:

based on the first directional audio signal and the second directional audio signal, determine a first relative score indicating a difference between the first directional audio signal and the second directional audio signal, wherein the first relative score gives information regarding misalignment in directional sensitivity between the adaptive beamformer and the fixed beamformer, and output the first relative score for controlling further processing of the first and the second input audio signal or for determining a mispositioning of the microphone apparatus.

Consequently, the first relative score gives information regarding the misalignment of the beam sensitivity between the adaptive beamformer and the fixed beamformer. The information regarding misalignment may be used in controlling further processing of the audio signals or may be used for determining a mispositioning of the microphone apparatus. Thus, by having the relative score mispositioning of the microphone apparatus may be compensated for via processing or may be corrected by positioning the microphone apparatus correctly.

The microphone apparatus may be configured to be worn by a user. The microphone apparatus may be arranged at the user's ear, on the user's ear, over the user's ear, in the user's ear, in the user's ear canal, behind the user's ear, and/or in the user's concha, i.e., the microphone apparatus is configured to be worn at the user's ear.

The microphone apparatus may be configured to be worn by a user at each ear, e.g., a pair of ear buds or a head set with two earcups. In the embodiment where the microphone apparatus is to be worn at both ears, the components meant to be worn at each ear may be connected, such as wirelessly connected and/or connected by wires, and/or by a strap. The components meant to be worn at each ear may be substantially identical or differ from each other.

The microphone apparatus may be a hearable such as a headset, headphones, earphones, ear bud, hearing aids, an over the counter (OTC) hearing device, a hearing protection device, a one-size-fits-all microphone apparatus, a custom microphone apparatus or another head-wearable microphone apparatus. The microphone apparatus may be a speaker phone, or another device not configured to be worn by a user.

The microphone apparatus may be embodied in various housing styles or form factors. Some of these form factors are earbuds, on the ear headphones, or over the ear headphones. The person skilled in the art is aware of various kinds of microphone apparatus and of different options for arranging the microphone apparatus in and/or at the ear of the microphone apparatus wearer.

The microphone apparatus comprises a plurality of input transducers. The plurality of input transducers may comprise a plurality of microphones. The plurality of input transducers may be configured for converting an acoustic signal into an electric input signal. The electric input signal may be an analog signal. The electric input signal may be a digital signal. The plurality of input transducers may be coupled to one or more analog-to-digital converters configured for converting the analog input signal into a digital input signal.

The microphone apparatus may comprise one or more antennas configured for wireless communication. The one or more antennas may comprise an electric antenna. The electric antenna is configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antennas may comprise a magnetic antenna. The magnetic antenna may comprise a magnetic core. The magnetic antenna comprises a coil. The coil may be coiled around the magnetic core. The magnetic antenna is configured for wireless communication at a second frequency. The second frequency may be below 100 MHZ. The second frequency may be between 9 MHZ and 15 MHZ.

The microphone apparatus may comprise one or more wireless communication units. The one or more wireless communication units may comprise one or more wireless receivers, one or more wireless transmitters, one or more transmitter-receiver pairs, and/or one or more transceivers. At least one of the one or more wireless communication units may be coupled to the one or more antennas. The wireless communication unit may be configured for converting a wireless signal received by at least one of the one or more antennas into an electric input signal. The microphone apparatus may be configured for wired/wireless audio communication, e.g., enabling the user to listen to media, such as music or radio, and/or enabling the user to perform phone calls.

A wireless signal may originate from external sources, such as spouse microphone devices, wireless audio transmitter, a smart computer, and/or a distributed microphone array associated with a wireless transmitter.

The microphone apparatus may be configured for wireless communication with one or more external devices, such as one or more accessory devices, such as a smartphone and/or a smart watch.

The microphone apparatus may comprise one or more processing units. The processing unit may be configured for processing one or more input signals. The processing may comprise compensating for a hearing loss of the user, i.e., apply frequency dependent gain to input signals in accordance with the user's frequency dependent hearing impairment. The processing may comprise performing feedback cancellation, beamforming, tinnitus reduction/masking, noise reduction, noise cancellation, speech recognition, bass adjustment, treble adjustment, face balancing and/or processing of user input. The processing unit may be a processor, an integrated circuit, an application, functional module, etc. The processing unit may be implemented in a signal-processing chip or a printed circuit board (PCB). The processing unit is configured to provide an electric output signal based on the processing of one or more input signals. The processing unit may be configured to provide one or more further electric output signals. The one or more further electric output signals may be based on the processing of one or more input signals. The processing unit may comprise a receiver, a transmitter and/or a transceiver for receiving and transmitting wireless signals. The processing unit may control one or more playback features of the microphone apparatus.

The microphone apparatus may comprise an output transducer. The output transducer may be coupled to the processing unit. The output transducer may be a loudspeaker, or any other device configured for converting an electrical signal into an acoustical signal. The receiver may be configured for converting an electric output signal into an acoustic output signal.

The wireless communication unit may be configured for converting an electric output signal into a wireless output signal. The wireless output signal may comprise synchronization data. The wireless communication unit may be configured for transmitting the wireless output signal via at least one of the one or more antennas.

The microphone apparatus may comprise a digital-to-analog converter configured to convert an electric output signal or a wireless output signal into an analog signal.

The microphone apparatus may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The microphone apparatus may comprise a memory, including volatile and non-volatile forms of memory.

The main microphone array may comprise two or more microphones. The main microphone array may comprise one or more directional microphones and/or one or more omnidirectional microphones. The main microphone array may comprise a uniform linear array. The main microphone array may comprise an end-fire array. The main microphone array may comprise a broadside array. The main microphone array comprises a first microphone adapted to provide a first input audio signal representing sound at a first microphone inlet. The main microphone array comprises a second microphone adapted to provide a second input audio signal representing sound at a second microphone inlet. The first microphone inlet and the second microphone inlet may be arranged as an end-fire array or a broadside array. The first microphone inlet is spatially separated from the second microphone inlet. The main microphone array is configured to provide a main input vector comprising the first and the second input audio signal as components. The main input vector may be provided as an electrical signal. The main input vector may be provided as an analog or a digital signal. The main microphone array may be wired or wirelessly communicatively connected to a processing unit of the microphone apparatus and be configured to transmit the main input vector to a processing unit of the microphone apparatus. The main microphone array may comprise an analog-to-digital converter to convert an analog signal to a digital signal, e.g., converting analog signals produced from the first microphone and the second microphone into digital signals.

In the context of the present disclosure a speech quality may be determined by a wide range of parameters. The speech quality may be determined as a direct to reverb ratio, where a higher direct to reverb ratio is indicative of a higher speech quality. The speech quality may be determined as a signal to noise, where a higher signal to noise ratio is indicative of a higher speech quality. The speech quality may be determined as a predicted MOS (Mean Opinion Score), where a higher MOS is indicative of a higher speech quality. Other audio parameters may as well be used for defining the speech quality.

In the context of the present disclosure the terms a beamformer or beamforming may be interpreted broadly as any processing or means for providing an audio signal with a directional sensitivity.

In the context of the present disclosure an audio signal with directional sensitivity may be understood as an audio signal, where sound emitted from a specific direction, or a specific range of directions is focused on, e.g., sound from a specific direction or a specific range of directions is left unchanged or amplified, while sound from other directions is dampened or removed. When stating that the beamformers provide an audio signal with a directional sensitivity it may be understood as the beamformers providing an audio signal focused on sounds emitted from the direction corresponding to the directional sensitivity, where sounds emitted from directions not corresponding to the directional sensitivity are filtered fully or at least partly away from the provided audio signal.

The adaptive beamformer may be an analog adaptive beamformer or a digital adaptive beamformer. The adaptive beamformer may be configured to receive the main input vector from the main microphone array as an analog or a digital signal. The adaptive beamformer is configured to provide a first directional audio signal, based on the main input vector. The directional sensitivity of the first directional audio signal is chosen to optimize speech quality. The adaptive beamformer may be set to optimize speech quality by optimizing the directional sensitivity of the first directional audio signal based on a specific audio parameter, e.g., optimizing a signal to noise ratio.

The adaptive beamformer may improve the speech quality by applying one or more beamforming weights to the main input vector. The adaptive beamformer may improve the speech quality by applying a set of beamforming filters/weights to the main input vector. The beamforming weight may be expressed as a beamforming weight vector. Different adaptive algorithms may be used for calculating the desired beamforming weights such as minimum variance distortionless response, generalized eigen values, simple matrix inversion, least mean squares, conjugate gradient method, and etc. The adaptive beamformer may be configured to process the main input vector in the time domain. The adaptive beamformer may be configured to process the main input vector in the frequency domain, e.g., by determining the Fourier transform of the main input vector before undergoing beamforming.

In an embodiment the adaptive beamformer may comprise a machine learning model. Model coefficients of the machine learning model may be stored in a memory of the microphone apparatus. In an embodiment, the machine learning model may be an off-line trained neural network. In an embodiment, the neural network may comprise one or more input layers, one or more intermediate layers, and/or one or more output layers. The one or more input layers of the neural network may receive the main input vector as the input. The one or more output layers of the neural network may provide the first directional audio signal as output. The one or more output layers of the neural network may provide one or more beamforming weights as output.

In an embodiment, the machine learning model of the adaptive beamformer may be a deep neural network. In an embodiment the deep neural network may be a convolutional neural network. In an embodiment the deep neural network may be a Region-Based Convolutional Neural Network. In an embodiment the deep neural network may be a wavenet neural network. In an embodiment the deep neural network may be a gaussian mixture model. In an embodiment the deep neural network may be a regression model. In an embodiment the deep neural network may be a linear factorization model. In an embodiment the deep neural network may be a kernel regression model. In an embodiment the deep neural network may be a Non-Negative Matrix Factorization model.

The fixed beamformer may be an analog fixed beamformer or a digital fixed beamformer. The fixed beamformer may be configured to receive the main input vector from the main microphone array as an analog or a digital signal. The fixed beamformer is configured to provide a second directional audio signal, based on the main input vector. The directional sensitivity of the second directional audio signal is predetermined. The directional sensitivity of the second directional audio may be predetermined during a tuning process of the microphone apparatus. The tuning process may be performed in a lab setting by an audio expert. The tuning process may be performed by the end user of the microphone apparatus. The predetermined directional sensitivity may be predetermined by a user of the microphone apparatus based on user preferences or a set-up procedure. The predetermined directional sensitivity may be tunable by a user to suit new surroundings of the microphone apparatus or to suit a new user of the microphone apparatus. The user may input a directional sensitivity to the fixed beamformer, e.g., input a desired direction or a range of desired directions on which the fixed beamformer should be focused. The fixed beamformer may be configured to process the main input vector in the time domain. The fixed beamformer may be configured to process the main input vector in the frequency domain, e.g., by determining the Fourier transform of the main input vector before undergoing beamforming. The fixed beamformer may comprise one or more fixed audio filters for processing the main input vector to provide the second directional audio signal.

The analyzer may be configured to receive the first directional audio signal and the second directional audio signal as analog or digital signals. The analyzer is configured to determine a first relative score, based on the first directional audio signal and the second directional audio signal. The analyzer is configured to output the first relative score. The analyzer may determine the first relative score by determining one or more audio parameters of the first directional audio signal and one or more parameters of the second directional audio signal, and compare the one or more audio parameters of the first directional audio signal with the one or more audio parameters of the second directional audio signal.

The adaptive beamformer, the fixed beamformer and the analyzer may all be digital processing blocks comprised by a processing unit, e.g., a digital signal processor. The adaptive beamformer, the fixed beamformer and the analyzer may all be processing units comprised by a plurality of interconnected processing units, e.g., one processing unit comprising the adaptive beamformer and the fixed beamformer, and another processing unit comprising the analyzer and connected to the processing unit comprising the adaptive beamformer and the fixed beamformer. Alternatively, the adaptive beamformer, the fixed beamformer may be provided as analog beamformers and the analyzer may be provided as a digital processing block within a processing unit, where an analog to digital converter is arranged in-between the beamformers and the analyzer.

When stating the first microphone inlet and the second microphone inlet are spatially separated it is to be understood as the inlets are situated at different locations, i.e., arranged in different positions on the microphone apparatus.

The first relative score may be determined as a difference in signal to noise ratio in the first directional audio signal, and the second directional audio signal. The first relative score may be determined as a difference in speech quality in the first directional audio signal, and the second directional audio signal.

The first relative score may be determined as a difference in the root mean square in the first directional audio signal, and the second directional audio signal.

In an embodiment the main microphone array further comprises one or more microphones adapted to provide one or more further input audio signals representing sound at one or more further microphone inlet, and wherein the main microphone array is configured to:

provide a main input vector comprising the first, the second and the one or more further input audio signal as components.

By providing additional input audio signal it may improve the performance of the beamformers by providing additional data for processing.

In an embodiment the first microphone and/or the second microphone are omnidirectional microphones.

Hence, the microphones may be sensitive to sound from all directions, and consequently be capable of delivering a directional audio signal which may be focused on a plethora of different directions.

In an embodiment, the first microphone and/or the second microphone are directional microphones.

A directional microphone being a microphone configured for picking up sounds from one or more specific directions. The directional microphone may be a gradient microphone.

In an embodiment the first microphone is a omni directional or a directional microphone, and the second microphone is a omni directional or a directional microphone, and the main microphone array further comprises one or more further directional or omni directional microphones adapted to provide one or more further audio signals representing sound at one or more further microphone inlets.

In an embodiment the directional sensitivity of the second directional audio signal is predetermined based on an intended position of the first microphone and/or the second microphone.

Consequently, the directional sensitivity of the fixed beamformer may be optimized for a certain use situation of the microphone apparatus, hence, the first relative score may provide information whether the microphone apparatus is being utilized correctly. For example, the microphone apparatus may be a headset with a boom arm comprising the first microphone and/or the second microphone, where the directional sensitivity of the fixed beamformer is optimized for the boom arm being positioned at the end of a slide rail, or in-front of the user's mouth. In that situation the relative score calculated by the analyzer gives information regarding whether the boom arm is arranged correctly at the end of a slide rail, or in-front of the user's mouth.

The intended position being a position of the microphone apparatus relative to an audio source, where the directional sensitivity of the fixed beamformer is optimized regarding the audio source.

The intended position may be mechanically determined by the structure of the microphone apparatus, e.g., if the first microphone and/or the second microphone are arranged on a boom arm pivotable between two end positions, such as a non-use position where the boom arm is tucked away, and a use position where the boom arm is meant to be used for picking up a voice of the user of the microphone apparatus. The intended position may then be the use position of the boom arm.

Alternatively, the boom arm may slide in a groove with built-in stops, e.g., formed by notches or protrusions, then one or more of the built-in stops may act as the intended position of the boom arm.

The intended position may be determined by a tuning process of the microphone apparatus. The tuning process may be performed during production of the microphone apparatus. The tuning process may be performed by a user of the microphone apparatus. The tuning process may comprise determining a use position of the microphone apparatus relative to a sound source, and to change the directionality of the fixed beamformed based on the determined use position. The directionality of the fixed beamformer may be chosen to optimize speech quality in the use position.

The tuning process may comprise a user arranging the microphone apparatus in a desired use position, the user may then provide a user input to a processing unit of the microphone apparatus indicating the microphone apparatus is in the desired position, and the user may then provide an user audio signal to the microphone apparatus from a user position, e.g., by the user speaking out loud, in response to receiving the user input and the user audio signal, the adaptive beamformer may determine a directionality to optimize for speech quality, and the processing unit may transfer the parameters for the directional sensitivity of the adaptive beamformer to the fixed beamformer, e.g., by transferring one or more beamforming weights from the adaptive beamformer to the fixed beamformer.

The intended position may be determined from a plurality of positions. For example, the intended position may be determined by a parametric function. A parametric function for the intended position may receive one or more input parameters, such as room parameters, room shape, room size, user locations within the room, user head shape, user head size, and/or number of users within the room, and then output the intended position based on the one or more input parameters, the intended position then being a position of the microphone apparatus based on the one or more input parameters.

In an embodiment the microphone apparatus further comprises, a speech detector configured to:

based on the main input vector, provide a speech probability signal indicating a probability of speech in the first and/or second input audio signal, and, wherein the adaptive beamformer is further configured to:

based on the speech probability signal and the main input vector, provide the first directional audio signal.

Hence, the adaptive beamformer may use information from the speech detector to further optimize the directional sensitivity based on the speech quality.

The speech detector may be comprised by a processing unit. The speech detector may be a digital processing block in a digital signal processor. The speech detector may be configured to receive the main input vector from the main microphone array as a digital signal. The speech detector is configured to provide a speech probability signal indicating a probability of speech in the first and/or second input audio signal. The speech detector may be configured to process the main input vector in the frequency domain, e.g., by determining the Fourier transform of the main input vector. The speech probability signal may be generated based on either the first input audio signal or second input audio signal. The first microphone or the second microphone may be defined as a reference microphone, the speech detector may be configured to determine the speech probability signal based on the input audio signal generated by the reference microphone.

In an embodiment the speech detector may comprise a machine learning model. Model coefficients of the machine learning model may be stored in a memory of the microphone apparatus. In an embodiment, the machine learning model may be an off-line trained neural network. In an embodiment, the neural network may comprise one or more input layers, one or more intermediate layers, and/or one or more output layers. The one or more input layers of the neural network may receive the main input vector as the input. The one or more output layers of the neural network may provide the speech probability signal as output.

In an embodiment, the machine learning model of the speech detector may be a deep neural network. In an embodiment the deep neural network may be a convolutional neural network. In an embodiment the deep neural network may be a Gaussian mixture model. In an embodiment the deep neural network may be a regression model. In an embodiment the deep neural network may be a linear factorization model. In an embodiment the deep neural network may be a kernel regression model. In an embodiment the deep neural network may be a representation learning model.

The speech probability signal may comprise a speech mask. The speech probability signal may be a data set showing the probability of speech as a function of time and frequency, where the probability of speech is expressed as values ranging from 0 to 1, where 1 indicates the presence of speech and 0 indicates the absence of speech. In other word values of 0, and/or in the range of 0 to 0.5 may define speech inactive regions, and values of 1, and/or in the range from 0.5 to 1 may define speech active regions.

The adaptive beamformer may be configured to determine one or more beamforming weights based on the speech probability signal and the main input vector. The adaptive beamformer may be configured to determine covariance matrices, based on the speech probability signal, the noise probability signal and the main input vector. The adaptive beamformer may determine one or more beamforming weights based on the covariance matrices.

In an embodiment the microphone apparatus comprises a signal path selector, and wherein the analyzer is further configured to:

compare the first relative score to a first threshold, and provide a first pass signal if the first relative score exceeds a first threshold, and wherein the signal path selector is configured to, in response to the first pass signal being provided:

pass on the first directional audio signal for further processing to provide an audio signal to be transmitted, and stop the second directional audio signal from being further processed.

Hence, the use of processing power may be allocated in an efficient manner without wasting processing power on further processing the second directional audio signal.

Further processing of the first directional audio signal may comprise encoding the first directional audio signal. Further processing of the first directional audio signal may comprise filtering the first directional audio signal. Further processing of the first directional audio signal may comprise transmitting the first directional audio signal to a device external to the microphone apparatus. Further processing of the first directional audio signal may comprise outputting the first directional audio signal, e.g., outputting the first directional audio signal via a speaker or other output transducer.

The first threshold may be determined during a tuning process of the microphone apparatus. The tuning process may be performed during the development of the microphone apparatus. The tuning process may be performed during production of the microphone apparatus. The tuning process may be performed by a user of the microphone apparatus. The tuning process may be performed by a user listening test, where the user determines the first threshold based on listening to the first directional audio signal and the second directional audio signal at different first relative scores.

The first threshold may be set as a fixed value. Where the first relative score is determined as a difference in signal to noise ratio between the fixed beamformer and the adaptive beamformer the first threshold may be set to 0.5 dB, 1 dB, or 2 dB.

In an embodiment the first threshold comprises a plurality of thresholds, each of the plurality of thresholds being associated with a respective frequency band.

In an embodiment the microphone apparatus comprises a signal path selector, and wherein the analyzer is further configured to:

compare the first relative score to a first threshold, and provide a second pass signal if the first relative score does not exceed a first threshold, and wherein the signal path selector is configured to, in response to the second pass signal being provided:

pass on the second directional audio signal for further processing to provide an audio signal to be transmitted, and stop the first directional audio signal from being further processed.

Hence, the signal path for processing of the audio signals is simplified.

Further processing of the second directional audio signal may comprise encoding the second directional audio signal. Further processing of the second directional audio signal may comprise filtering the second directional audio signal. Further processing of the second directional audio signal may comprise transmitting the second directional audio signal to a device external to the microphone apparatus. Further processing of the second directional audio signal may comprise outputting the second directional audio signal, e.g., outputting the second directional audio signal via a speaker or other output transducer.

In an embodiment the adaptive beamformer is further configured to:

go from an active mode to a passive mode in response to the analyzer providing the second pass signal.

Hence, processing power may be freed up for other purposes. Furthermore, battery consumption may also be lowered.

By the active mode is meant a mode of operation where the adaptive beamformer provides the first directional audio signal in parallel with the fixed beamformer providing the second directional audio signal. Unless otherwise stated the adaptive beamformer may be assumed to be in the active mode.

By the passive mode is meant a mode of operation where the adaptive beamformer stops providing the first directional audio signal fully in parallel with the fixed beamformer providing the second directional audio signal. In the passive mode may the adaptive beamformer may stop determining covariance matrices for incoming audio signals. In the passive mode the adaptive beamformer may stop providing the first directional audio signal. In the passive mode the adaptive beamformer may provide the first directional audio intermittently, e.g., every 0.5 seconds, 1 second, 2 seconds, 3 seconds, 4 seconds, or 5 seconds. The adaptive beamformer may go from the passive mode to the active mode in response to the analyzer providing the first pass signal.

In an embodiment the analyzer is further configured to:

determine an initial speech quality parameter, wherein the initial speech quality parameter is associated with the first audio input, the second audio input, or a combination of the first audio input and the second audio input, determine a first speech quality parameter, wherein th-e first speech quality parameter is associated with the first directional audio signal, determine a second speech quality parameter, wherein the second speech quality parameter is associated with the second directional audio signal, determine a first difference between the first speech quality parameter and the initial speech quality parameter, determine a second difference between the second speech quality parameter and the initial speech quality parameter, based on the first difference and the second difference, determine the first relative score.

Hence, a simple and efficient manner of comparing the first directional audio signal and the second directional audio signal is achieved. By looking at the improvement achieved by the beamformers a simple measure is obtained for comparing the beamformers to each other.

The first difference may be seen as a measure for the improvement in speech quality achieved by the processing applied to the main input vector by the adaptive beamformer. The second difference may be seen as a measure for the improvement in speech quality achieved by the processing applied to the main input vector by the fixed beamformer.

The initial speech quality parameter, the first speech quality parameter, and the second speech quality parameter may be determined by a wide range of parameters. The speech quality parameters may be determined as direct to reverb ratios. The speech quality parameters may be determined as signal to noise ratios. The speech quality parameters may be determined as MOS. The speech quality parameters may be determined as noise rejections. The speech quality parameters may be determined as signal to speech distortion. The speech quality parameters may be determined as noise attenuation. Other audio parameters may as well be used for defining the speech quality parameters.

The initial speech quality parameter may be determined by defining either the first microphone or the second microphone as a reference microphone, and then determining the initial speech quality parameter for the input audio signal associated with the reference microphone.

The analyzer may be configured to determine initial speech quality parameter by receiving the first audio input, the second audio input, or a combination of the first audio input and the second audio input, and the speech probability signal. The analyzer may then determine a signal to noise ratio, where the signal is determined as the power of the first audio input, the second audio input, or a combination of the first audio input and the second audio input in the speech active regions, and the noise is determined as the power of the first audio input, the second audio input, or a combination of the first audio input and the second audio input in the speech inactive region. The analyzer may be configured to determine the speech active region and the speech inactive region based on the speech probability signal.

The analyzer may be configured to determine the first speech quality parameter by receiving the first directional audio signal. The analyzer may then determine a signal to noise ratio, where the signal is determined as the power of the first directional audio signal in the speech active regions, and the noise is determined as the power of the first directional audio signal in the speech inactive region. The analyzer may be configured to determine the speech active region and the speech inactive region based on the speech probability signal.

The analyzer may be configured to determine the second speech quality parameter by receiving the second directional audio signal. The analyzer may then determine a signal to noise ratio, where the signal is determined as the power of the second directional audio signal in the speech active regions, and the noise is determined as the power of the second directional audio signal in the speech inactive region. The analyzer may be configured to determine the speech active region and the speech inactive region based on the speech probability signal.

In an embodiment the microphone apparatus is a headset comprising:

a movable boom arm, wherein the first microphone inlet and/or the second microphone inlet are arranged on the boom arm.

Hence, a user of the headset may correct any mispositioning by moving the boom arm.

In embodiment where the microphone apparatus is a speaker phone or a headset without a boom arm, mispositioning of the first microphone inlet and/or the second microphone inlet may be corrected by moving the whole microphone apparatus relative to one or more users of the microphone apparatus.

In an embodiment the analyzer is further configured to:

compare the first relative score to a first threshold, and provide a misposition signal if the first relative score exceeds the first threshold, output the misposition signal as a user notification for notifying the user regarding a misposition of the first microphone inlet and/or the second microphone inlet.

Hence, the user will be aware of any mispositioning of the microphone apparatus and may act to correct the mispositioning.

The user notification may be provided by a loudspeaker comprised by the microphone apparatus or by an external device communicatively connected to the microphone apparatus, e.g., giving a voice instruction to correct the position of the microphone apparatus. The user notification may be provided as a text message to be displayed on a display of the microphone apparatus, or a display of an external device communicatively connected to the microphone apparatus.

In an embodiment the microphone apparatus further comprises a misposition indicator, wherein the misposition indicator is configured to:

receive the misposition signal, and provide a user stimulus for indicating the misposition of the first microphone inlet and/or the second microphone inlet in response to receiving the misposition signal.

Hence, the user will be aware of any mispositioning of the microphone apparatus and may act to correct the mispositioning.

The misposition indicator may be an LED, a loudspeaker, a vibration module, or other means capable of providing a user stimulus.

The user stimulus may be an auditory stimulus, a visual stimulus, a tactile stimulus, or other form of stimulus or stimuli.

According to a second aspect of the present disclosure there is provided a computer implemented method comprising the steps of:

receiving a main input vector comprising as components a first input audio signal representing sound at a first microphone inlet and a second input audio signal representing sound at a second microphone inlet, wherein the first microphone inlet is spatially separated from the second microphone inlet, based on the main input vector, providing a first directional audio signal, wherein the directional sensitivity of the first directional audio signal is chosen to optimize a speech quality, based on the main input vector, providing a second directional audio signal, wherein the directional sensitivity of the second directional audio signal is predetermined, based on the first directional audio signal and the second directional audio signal, determining a first relative score indicating a difference between the first directional audio signal and the second directional audio signal, wherein the first relative score gives information regarding misalignment in directional sensitivity between the adaptive beamformer and the fixed beamformer, and outputting the first relative score for controlling further processing of the first and the second input audio signal or for determining a mispositioning of the microphone apparatus.

It is readily understood that all steps described in relation to the first aspect regarding processing of audio signals may be carried out in a computer implemented method.

Within this document, the singular forms "a", "an", and "the" specify the presence of a respective entity, such as a feature, an operation, an element, or a component, but do not preclude the presence or addition of entities. Likewise, the words "have", "include" and "comprise" specify the presence of respective entities, but do not preclude the presence or addition of entities. The term "and/or" specifies the presence of one or more of the associated entities.

BRIEF DESCRIPTION OF THE DRAWINGS

The disclosure will be explained in more detail below together with preferred embodiments and with reference to the drawings in which.

The figures are schematic and simplified for clarity, and they just show details essential to understanding the disclosure, while other details may be left out. Where practical, like reference numerals and/or labels are used for identical or corresponding parts.

DETAILED DESCRIPTION OF THE DRAWINGS

The detailed description given herein and the specific examples indicating preferred embodiments of the disclosure are intended to enable a person skilled in the art to practice the disclosure and should thus be regarded mainly as an illustration of the disclosure. The person skilled in the art will be able to readily contemplate applications of the present disclosure as well as advantageous changes and modifications from this description without deviating from the scope of the disclosure. Any such changes or modifications mentioned herein are meant to be non-limiting for the scope of the disclosure. An aspect or an advantage described in conjunction with a particular embodiment is not necessarily limited to that embodiment and can be practiced in any other embodiments even if not so illustrated, or if not so explicitly described.

Figure 1:
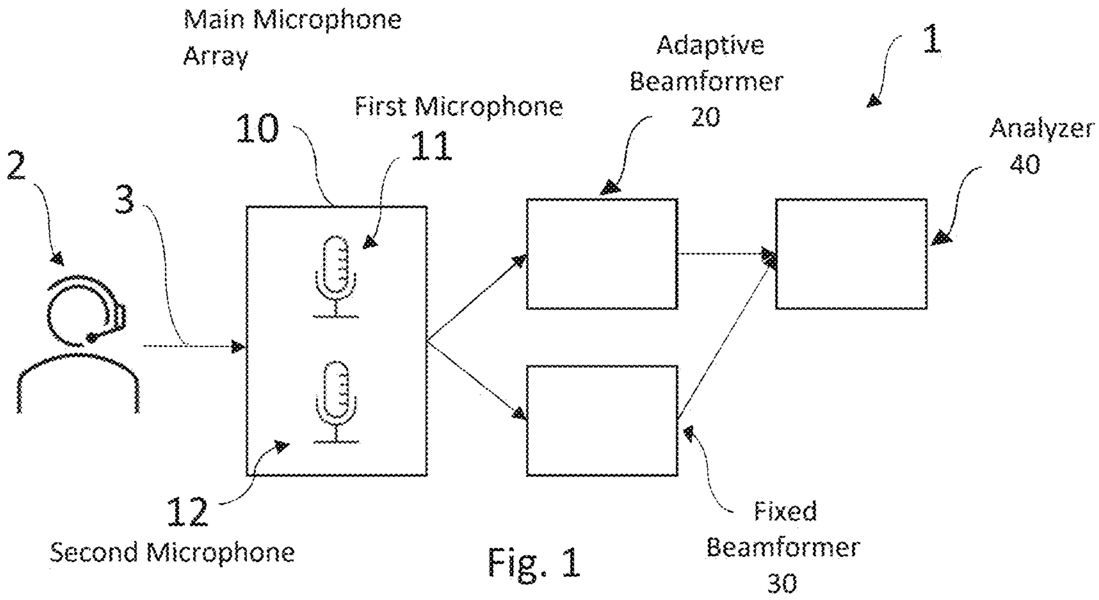
FIG. 1 shows a schematic block diagram of an embodiment of a microphone apparatus according to the present disclosure.

Referring initially to FIG. 1 depicting a schematic block diagram of an embodiment of a microphone apparatus 1 according to the present disclosure. The microphone apparatus 1 comprises a main microphone array 10, an adaptive beamformer 20, a fixed beamformer 30, and an analyzer 40. The microphone apparatus 1 may be a headset with or without a boom arm, a pair of earbuds, a speaker phone or other audio devices. The main microphone array 10 comprises a first microphone 11 adapted to provide a first input audio signal representing sound at a first microphone inlet, a second microphone 12 adapted to provide a second input audio signal representing sound at a second microphone inlet. The first microphone inlet is spatially separated from the second microphone inlet. The main microphone array 10 is configured to capture sounds created by a sound source external to the microphone apparatus, e.g., the main microphone array 10 may capture a user signal 3 created by a user 2 of the microphone apparatus 1, the first input audio signal and the second input audio signal may then be the user signal 2 as captured by the first microphone 11 and the second microphone 12. The main microphone array 10 is configured to provide a main input vector comprising the first and the second input audio signal as components. The main input vector is provided as a digital signal. The first microphone 11 and the second microphone 12 are omnidirectional microphones.

The main input vector is received by the adaptive beamformer 20 from the main microphone array 10. The adaptive beamformer 20 is configured to, based on the main input vector, provide a first directional audio signal. The directional sensitivity of the first directional audio signal is chosen to optimize a speech quality.

The main input vector is received by the fixed beamformer 30 from the main microphone array 10. The fixed beamformer 30 is configured to, based on the main input vector, provide a second directional audio signal. The directional sensitivity of the second directional audio signal is predetermined. The directional sensitivity of the second directional audio signal is predetermined based on an intended position of the first microphone 11 and/or the second microphone 12.

The analyzer 40 receives the first directional audio signal from the adaptive beamformer 20, and receives the second directional audio from the fixed beamformer 30. The analyzer is configured to, based on the first directional audio signal and the second directional audio signal, determine a first relative score indicating a difference between the first directional audio signal and the second directional audio signal. The analyzer 40 then outputs the first relative score. The first relative score may be outputted for further processing the microphone apparatus and/or be outputted to devices external to the microphone apparatus. The analyzer 40 may determine the first relative score by determining a first audio parameter associated with the first directional audio signal and a second audio parameter associated with the second directional audio signal and compare the first audio parameter to the second audio parameter to determine the first relative score. The comparison between the first audio parameter and the second audio parameter may be to determine a difference between the first audio parameter and the second audio parameter.

The main microphone array 10, the adaptive beamformer 20, the fixed beamformer 30, and the analyzer 40 may all form part of a digital signal processor of the microphone apparatus 1. The main microphone array 10 may comprise an analog to digital converter configured to convert the audio signals picked up by the first microphone 11 and the second microphone 12 into digital signals.

Figure 2:
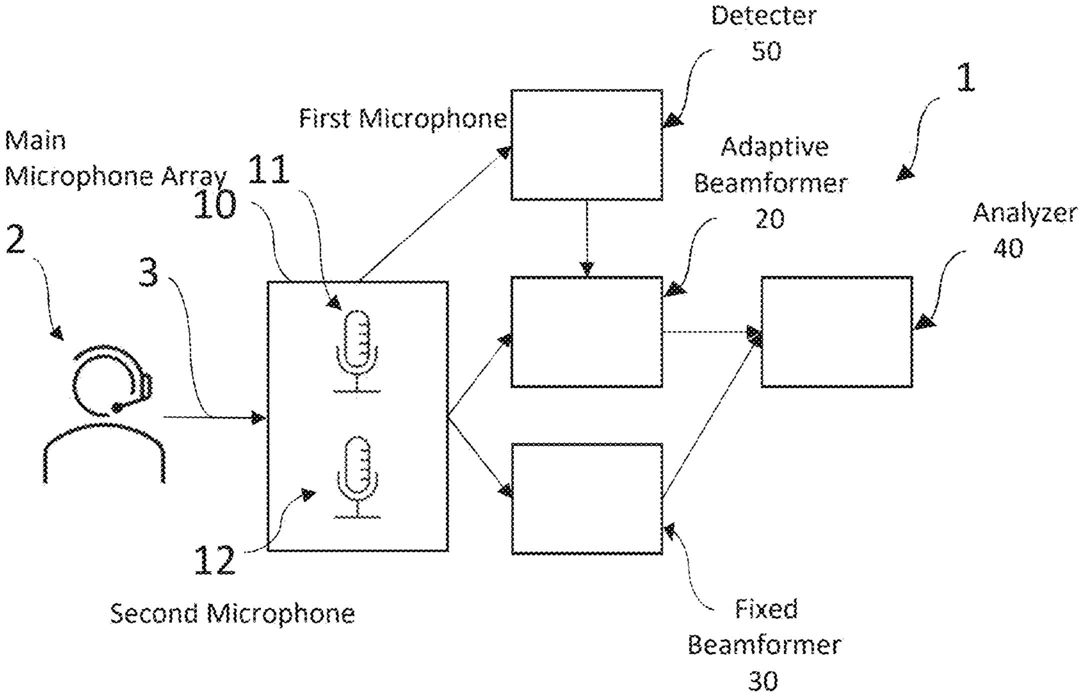
FIG. 2 shows a schematic block diagram of another embodiment of a microphone apparatus according to the present disclosure.
Figure 3:
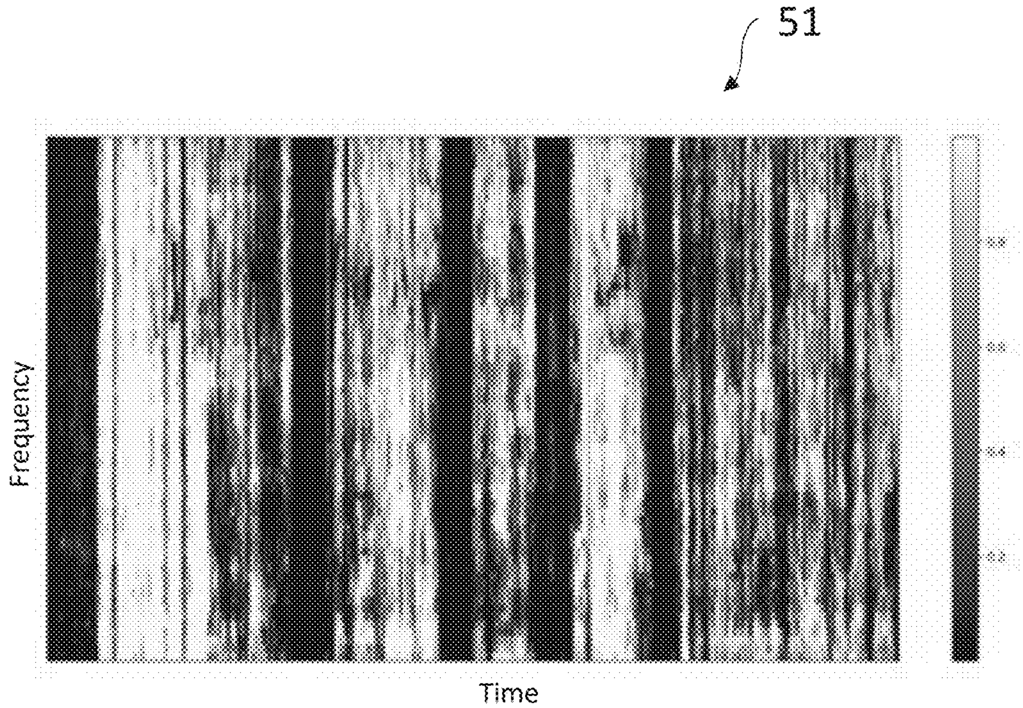
FIG. 3 shows an example of a speech mask outputted by a speech detector according to the present disclosure.

Referring now to FIGS. 2 and 3, where FIG. 2 depicts a schematic block diagram of an embodiment of a microphone apparatus 1 according to the present disclosure, and FIG. 3 depicts an example of a speech mask 51 outputted by a speech detector 50 according to the present disclosure. The microphone apparatus of FIG. 2 differs from that of FIG. 1 in that it further comprises a speech detector 50. The speech detector 50 is configured to receive the main input vector from the main microphone array 10. The speech detector 50 is configured to, based on the main input vector, provide a speech probability signal indicating a probability of speech in the first and/or second input audio signal. Preferably, either the first microphone or the second microphone are picked as a reference microphone and the speech probability signal is provided based on the chosen reference microphone. The speech probability signal may be provided as a speech mask 51 as shown in FIG. 3.

The adaptive beamformer 20 receives the speech probability signal from the speech detector 50. The adaptive beamformer 20 is configured to, based on the speech probability signal and the main input vector, provide the first directional audio signal. The adaptive beamformer may determine a covariance matrix based on the speech probability signal and the main input vector and determine one or more beamforming weights based on the covariance matrix.

Figure 4:
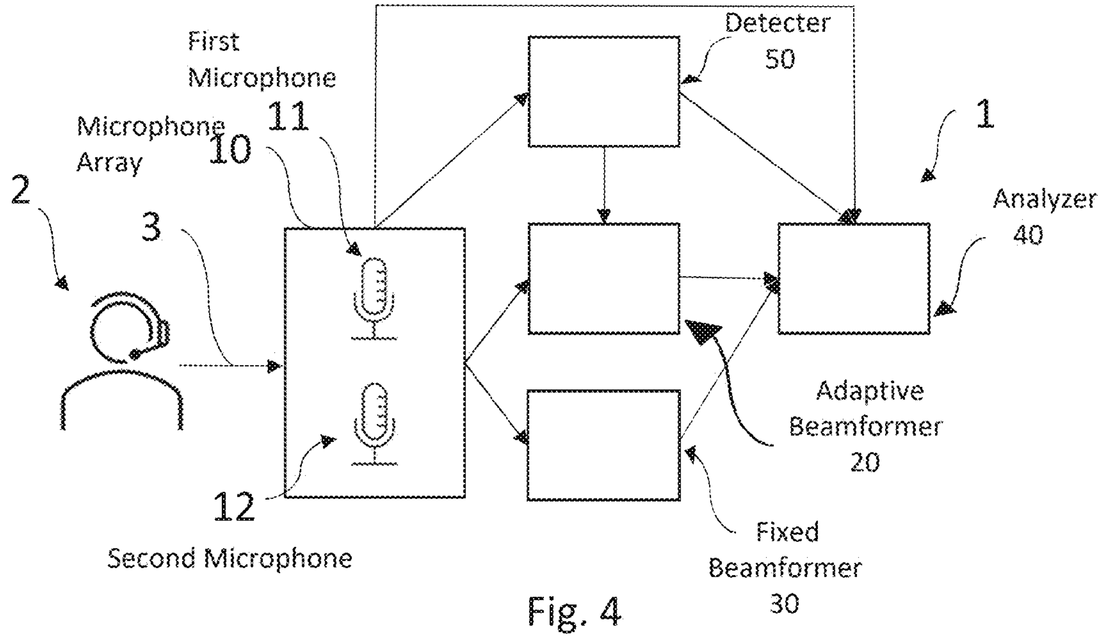
FIG. 4 shows a schematic block diagram of yet another embodiment of a microphone apparatus according to the present disclosure.

Referring now to FIG. 4 depicting a schematic block diagram of an embodiment of a microphone apparatus 1 according to the present disclosure. The embodiment of FIG. 4 differs from the depicted in FIG. 2 in that the main input vector is transmitted from the main microphone array 10 to the analyzer 40, and the speech probability signal is transmitted from the speech detector 50 to the analyzer 40.

The analyzer 40 in the present embodiment is further configured to determine an initial speech quality parameter. The initial speech quality parameter may be associated with the first audio input, the second audio input, or a combination of the first audio input and the second audio input. However, in the present embodiment the first microphone 11 is defined as a reference microphone and the initial speech quality parameter is determined based on the first input audio signal provided by the first microphone 11. The initial speech quality parameter is determined as a signal to noise ratio in the first input audio signal. Where the signal is determined as the power of the first audio input in a speech active region, and the noise is determined as the power of the first audio input in a speech inactive region. The analyzer 40 is configured to determine the speech active region and the speech inactive region based on the speech probability signal, e.g., the speech probability signal may be a speech mask 51 as depicted on FIG. 3, where the speech active region and the speech inactive regions may be directly determined based on the speech mask 51. The analyzer 40 is further configured to determine the first speech quality parameter by receiving the first directional audio signal. The analyzer 40 then determines a signal to noise ratio, where the signal is determined as the power of the first directional audio signal in the speech active regions, and the noise is determined as the power of the first directional audio signal in the speech inactive region. The analyzer 40 is further configured to determine the second speech quality parameter by receiving the second directional audio signal. The analyzer 40 then determines a signal to noise ratio, where the signal is determined as the power of the second directional audio signal in the speech active regions, and the noise is determined as the power of the second directional audio signal in the speech inactive region.

The analyzer 40 then determines a first difference between the first speech quality parameter and the initial speech quality parameter. The first difference may be viewed as giving a measure for the improvement or degradation in speech quality after the fixed beamformer has processed the main input vector. The analyzer 40 further determines a second difference between the second speech quality parameter and the initial speech quality parameter. The second difference may be viewed as giving a measure for the improvement or degradation in speech quality after the adaptive beamformer has processed the main input vector.

Based on the first difference and the second difference, the analyzer 40 is further configured to determine the first relative score. The first relative score is determined by determining the difference between the first difference and the second difference, the first difference may then be expressed as a dB difference between the first difference and the second difference.

Figure 5:
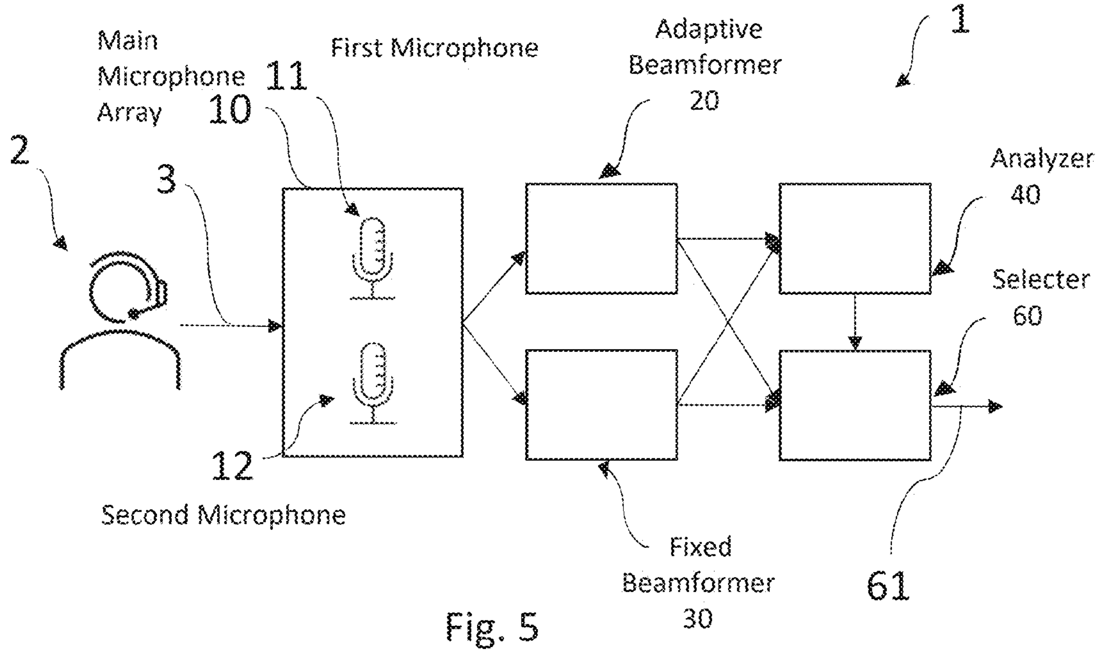
FIG. 5 shows a schematic block diagram of an embodiment of a microphone apparatus according to the present disclosure.

Referring now to FIG. 5 which depicts a schematic block diagram of an embodiment of a microphone apparatus 1 according to the present disclosure. The microphone apparatus of FIG. 5 differs from that of FIG. 1 in that it further comprises a signal path selector 60. The signal path selector 60 is configured to pass on a signal 61 for further processing. The signal path selector 60 is configured to receive the first directional audio signal from the adaptive beamformer 20. The signal path selector 60 is configured to receive the second directional audio signal from the fixed beamformer 30. The signal path selector 60 is configured to receive a first pass signal or a second pass signal from the analyzer 40. The analyzer 40 is configured to compare the first relative score to a first threshold. The first threshold being set as a fixed value of 1 dB. The analyzer 40 is configured to provide the first pass signal if the first relative score exceeds the first threshold. The analyzer 40 is configured to provide the second pass signal if the first relative score does not exceed the first threshold. In response to receiving the first pass signal, the signal path selector 60 is configured to pass on the first directional audio signal for further processing, and stop the second directional audio signal from being further processed. In response to receiving the second pass signal, the signal path selector 60 is configured to pass on the second directional audio signal for further processing, and stop the first directional audio signal from being further processed. The adaptive beamformer is further configured to receive the second pass signal, and in response to receiving the second pass signal go from an active mode to a passive mode.

Figure 6:
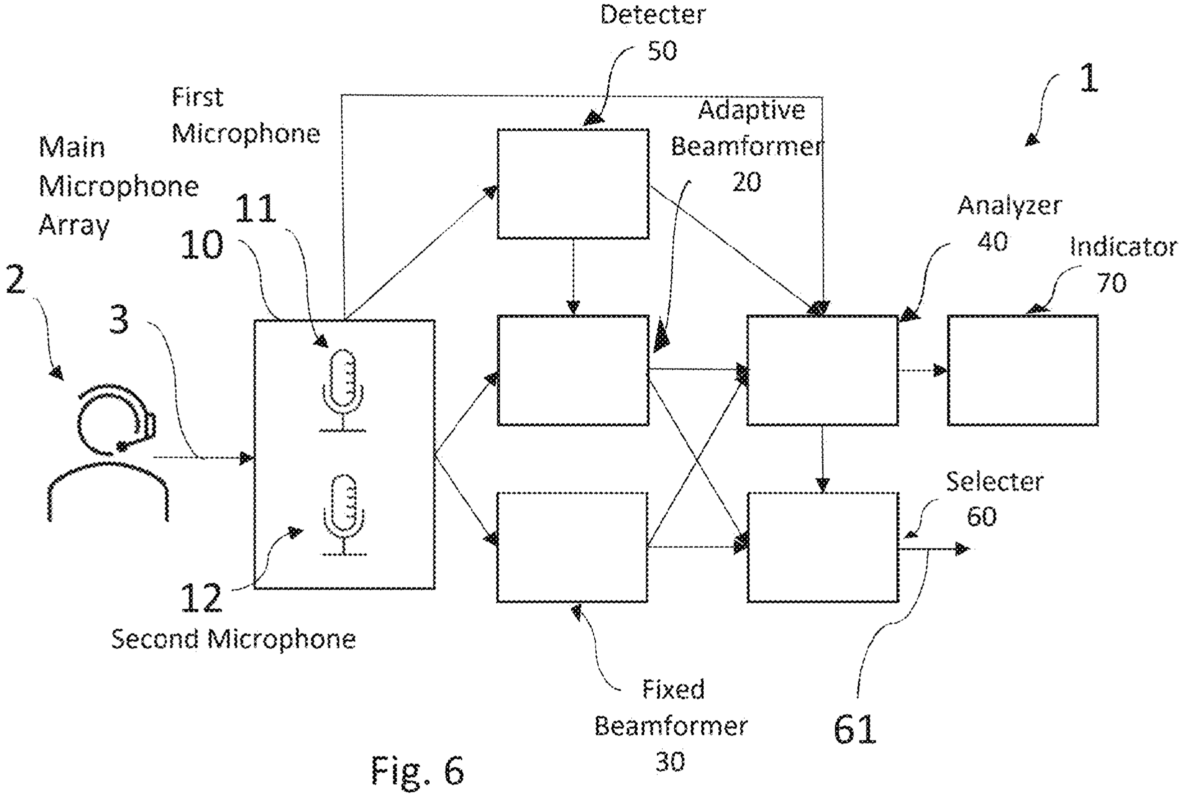
FIG. 6 shows a schematic block diagram of an embodiment of a microphone apparatus according to the present disclosure.

Lastly, referring to FIG. 6 which depicts a schematic block diagram of an embodiment of a microphone apparatus 1 according to the present disclosure. The microphone apparatus 1 depicted in FIG. 6 is a combination of the microphone apparatus 1 depicted in FIGS. 4 and 5, hence, the microphone apparatus of FIG. 6 comprises both a speech detector 50 and a signal path selector 60. The microphone apparatus 1 further comprises a misposition indicator 70. The analyzer 40 is further configured to compare the first relative score to the first threshold. The analyzer 40 is further configured to provide a misposition signal if the first relative score exceeds the first threshold. The analyzer 40 is further configured to provide a misposition signal if the first relative score exceeds the first threshold. The analyzer 40 is further configured to output the misposition signal as a user notification for notifying the user 2 regarding a misposition of the first microphone inlet and/or the second microphone inlet. The misposition indicator 70 is configured to receive the misposition signal and provide a user stimulus for indicating the misposition of the first microphone inlet and/or the second microphone inlet in response to receiving the misposition signal.

The disclosure is not limited to the embodiments disclosed herein, and the disclosure may be embodied in other ways within the subject-matter defined in the following claims. As an example, features of the described embodiments may be combined arbitrarily, e.g., in order to adapt devices according to the disclosure to specific requirements.

Any reference numerals and labels in the claims are intended to be non-limiting for the scope of the claims.

The invention claimed is:

1. A microphone apparatus, comprising:

a main microphone array;

an adaptive beamformer;

a fixed beamformer;

an analyzer; and a signal path selector, wherein the main microphone array comprises:

a first microphone adapted to provide a first input audio signal representing sound at a first microphone inlet, a second microphone adapted to provide a second input audio signal representing sound at a second microphone inlet, wherein the first microphone inlet is spatially separated from the second microphone inlet, and wherein the main microphone array is configured to:

provide a main input vector comprising the first and the second input audio signal as components, wherein the adaptive beamformer is configured to:

based on the main input vector, provide a first directional audio signal, wherein the directional sensitivity of the first directional audio signal is chosen to optimize a speech quality, wherein the fixed beamformer is configured to:

based on the main input vector, provide a second directional audio signal, wherein the directional sensitivity of the second directional audio signal is predetermined, and wherein the analyzer is configured to:

based on the first directional audio signal and the second directional audio signal, determine a first relative score indicating a difference between the first directional audio signal and the second directional audio signal, wherein the first relative score gives information regarding misalignment in directional sensitivity between the adaptive beamformer and the fixed beamformer, output the first relative score for controlling further processing of the first and the second input audio signal or for determining a mispositioning of the microphone apparatus, compare the first relative score to a first threshold, and provide a first pass signal if the first relative score exceeds a first threshold, and wherein the signal path selector is configured to, in response to the first pass signal being provided:

pass on the first directional audio signal for further processing to provide an audio signal to be transmitted, and stop the second directional audio signal from being further processed.

2. The microphone apparatus according to claim 1, wherein the first microphone and the second microphone are omnidirectional microphones.

3. The microphone apparatus according to claim 1, wherein the directional sensitivity of the second directional audio signal is predetermined based on an intended position of the first microphone and/or the second microphone.

4. The microphone apparatus according to claim 1, further comprising, a speech detector configured to:

based on the main input vector, provide a speech probability signal indicating a probability of speech in the first and/or second input audio signal, and wherein the adaptive beamformer is further configured to:

based on the speech probability signal and the main input vector, provide the first directional audio signal.

5. The microphone apparatus according to claim 1, wherein the analyzer is further configured to:

determine an initial speech quality parameter, wherein the initial speech quality parameter is associated with the first audio input, the second audio input, or a combination of the first audio input and the second audio input, determine a first speech quality parameter, wherein the first speech quality parameter is associated with the first directional audio signal, determine a second speech quality parameter, wherein the second speech quality parameter is associated with the second directional audio signal, determine a first difference between the first speech quality parameter and the initial speech quality parameter, determine a second difference between the second speech quality parameter and the initial speech quality parameter, based on the first difference and the second difference, determine the first relative score.

6. A microphone apparatus according to claim 1, wherein the microphone apparatus is a headset comprising:

a movable boom arm, wherein the first microphone inlet and/or the second microphone inlet are arranged on the boom arm.

7. A microphone apparatus according to claim 6, wherein the microphone apparatus further comprises:

a misposition indicator, configured to:

receive the misposition signal, and provide a user stimulus for indicating the misposition of the first microphone inlet and/or the second microphone inlet in response to receiving the misposition signal.

8. A microphone apparatus, comprising:

a main microphone array;

an adaptive beamformer;

a fixed beamformer;

an analyzer; and a signal path selector, wherein the main microphone array comprises:

a first microphone adapted to provide a first input audio signal representing sound at a first microphone inlet, a second microphone adapted to provide a second input audio signal representing sound at a second microphone inlet, wherein the first microphone inlet is spatially separated from the second microphone inlet, and wherein the main microphone array is configured to:

provide a main input vector comprising the first and the second input audio signal as components, wherein the adaptive beamformer is configured to:

based on the main input vector, provide a first directional audio signal, wherein the directional sensitivity of the first directional audio signal is chosen to optimize a speech quality, wherein the fixed beamformer is configured to:

based on the main input vector, provide a second directional audio signal, wherein the directional sensitivity of the second directional audio signal is predetermined, and wherein the analyzer is configured to:

based on the first directional audio signal and the second directional audio signal, determine a first relative score indicating a difference between the first directional audio signal and the second directional audio signal, wherein the first relative score gives information regarding misalignment in directional sensitivity between the adaptive beamformer and the fixed beamformer, output the first relative score for controlling further processing of the first and the second input audio signal or for determining a mispositioning of the microphone apparatus wherein the analyzer is further configured to:

compare the first relative score to a first threshold, and provide a second pass signal if the first relative score does not exceed a first threshold, and wherein the signal path selector is configured to, in response to the second pass signal being provided:

pass on the second directional audio signal for further processing to provide an audio signal to be transmitted, and stop the first directional audio signal from being further processed.

9. The microphone apparatus according to claim 8, wherein the adaptive beamformer is further configured to:

go from an active mode to a passive mode in response to the analyzer providing the second pass signal.

10. The microphone apparatus according to claim 8, wherein the first microphone and the second microphone are omnidirectional microphones.

11. The microphone apparatus according to claim 8, wherein the directional sensitivity of the second directional audio signal is predetermined based on an intended position of the first microphone and/or the second microphone.

12. The microphone apparatus according to claim 8, further comprising, a speech detector configured to:

based on the main input vector, provide a speech probability signal indicating a probability of speech in the first and/or second input audio signal, and wherein the adaptive beamformer is further configured to: based on the speech probability signal and the main input vector, provide the first directional audio signal.

13. A microphone apparatus, comprising:

a main microphone array;

an adaptive beamformer;

a fixed beamformer; and an analyzer, wherein the main microphone array comprises:

a first microphone adapted to provide a first input audio signal representing sound at a first microphone inlet, a second microphone adapted to provide a second input audio signal representing sound at a second microphone inlet, wherein the first microphone inlet is spatially separated from the second microphone inlet, and wherein the main microphone array is configured to:

provide a main input vector comprising the first and the second input audio signal as components, wherein the adaptive beamformer is configured to:

based on the main input vector, provide a first directional audio signal, wherein the directional sensitivity of the first directional audio signal is chosen to optimize a speech quality, wherein the fixed beamformer is configured to:

based on the main input vector, provide a second directional audio signal, wherein the directional sensitivity of the second directional audio signal is predetermined, and wherein the analyzer is configured to:

based on the first directional audio signal and the second directional audio signal, determine a first relative score indicating a difference between the first directional audio signal and the second directional audio signal, wherein the first relative score gives information regarding misalignment in directional sensitivity between the adaptive beamformer and the fixed beamformer, output the first relative score for controlling further processing of the first and the second input audio signal or for determining a mispositioning of the microphone apparatus, compare the first relative score to a first threshold, provide a misposition signal if the first relative score exceeds the first threshold, and output the misposition signal as a user notification for notifying the user regarding a misposition of the first microphone inlet and/or the second microphone inlet.

14. The microphone apparatus according to claim 13, wherein the first microphone and the second microphone are omnidirectional microphones.

15. The microphone apparatus according to claim 13, wherein the directional sensitivity of the second directional audio signal is predetermined based on an intended position of the first microphone and/or the second microphone.

16. The microphone apparatus according to claim 13, further comprising, a speech detector configured to:

based on the main input vector, provide a speech probability signal indicating a probability of speech in the first and/or second input audio signal, and wherein the adaptive beamformer is further configured to: based on the speech probability signal and the main input vector, provide the first directional audio signal.

* * * * *